United States Patent [19]
Bartlow et al.

[11] 3,860,478
[45] Jan. 14, 1975

[54] SLITTED INSULATING RIGID WALL COMPOSITE

[75] Inventors: David H. Bartlow; Mark E. Greenwood, both of Huntingdon, Pa.

[73] Assignee: Owens-Corning Fiberglass Corporation, Toledo, Ohio

[22] Filed: July 13, 1972

[21] Appl. No.: 271,461

[52] U.S. Cl.............. 161/117, 161/161, 161/113, 161/43, 156/257, 156/268, 220/9 LG, 220/9 F
[51] Int. Cl........ B32b 3/10, B32b 3/14, B65d 15/16
[58] Field of Search.......... 161/117, 161; 220/9 LG, 220/9 F

[56] References Cited
UNITED STATES PATENTS

| | | | |
|---|---|---|---|
| 3,511,743 | 5/1970 | Rach................................... | 161/117 |
| 3,525,661 | 8/1970 | Jackson.......................... | 161/161 X |
| 3,540,615 | 11/1970 | Paine.............................. | 161/161 X |
| 3,765,558 | 10/1973 | Withers............................... | 220/9 F |

*Primary Examiner*—George F. Lesmes
*Assistant Examiner*—Patricia C. Ives
*Attorney, Agent, or Firm*—Carl G. Staelin; John W. Overman

[57] ABSTRACT

A wall construction for fluid handling devices, especially fluid storage tanks, which is adapted for expansion and contraction, has a moistureproof expansion joint which does not materially weaken the wall construction. The expansion joint includes a slit in a portion of the wall and a shaped expansion member of substantially rigid material overlaying the slit. The member is integrally bonded to the wall on opposite sides of the slit and is shaped to allow for movement of the wall. The expansion joint is particularly suited for insulated tanks having a sandwich construction comprising reinforced plastic layers separated by a layer of polyurethane foam. The expansion member is preferably of glass fiber reinforced plastic.

6 Claims, 4 Drawing Figures

PATENTED JAN 14 1975  3,860,478
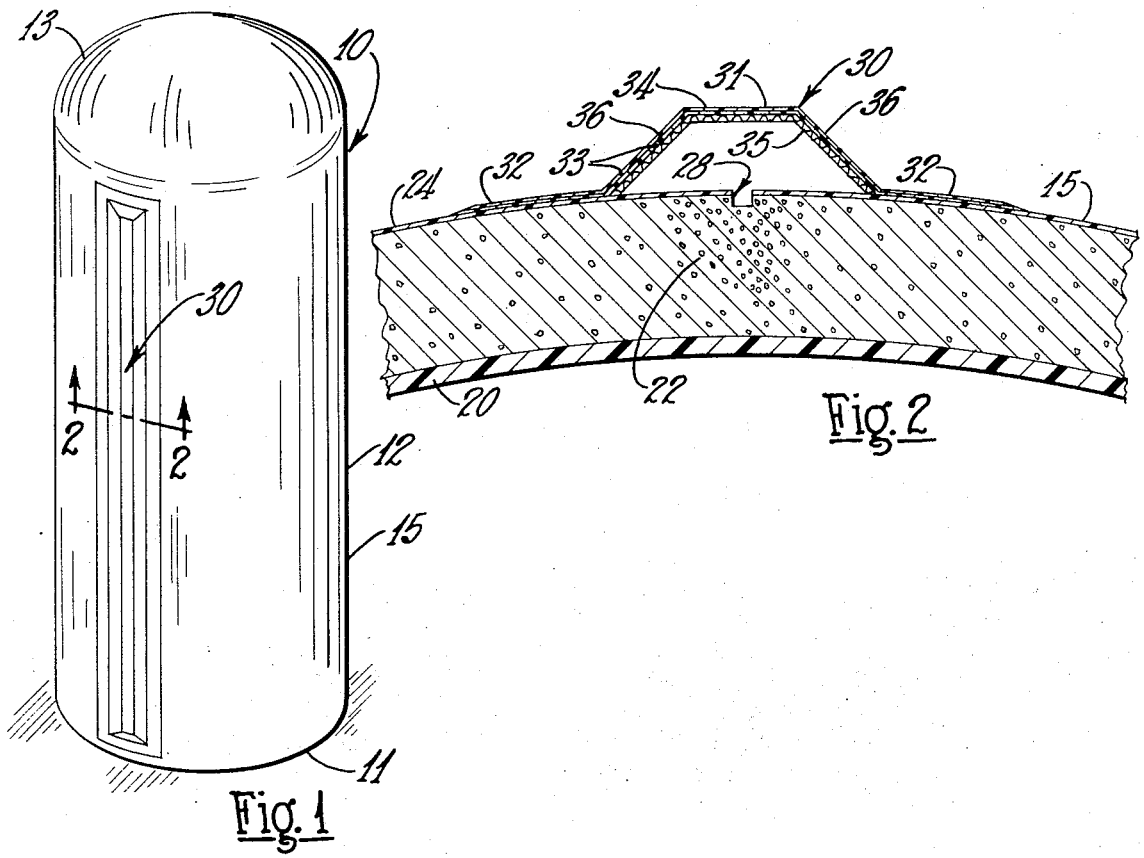
Fig.1
Fig.2
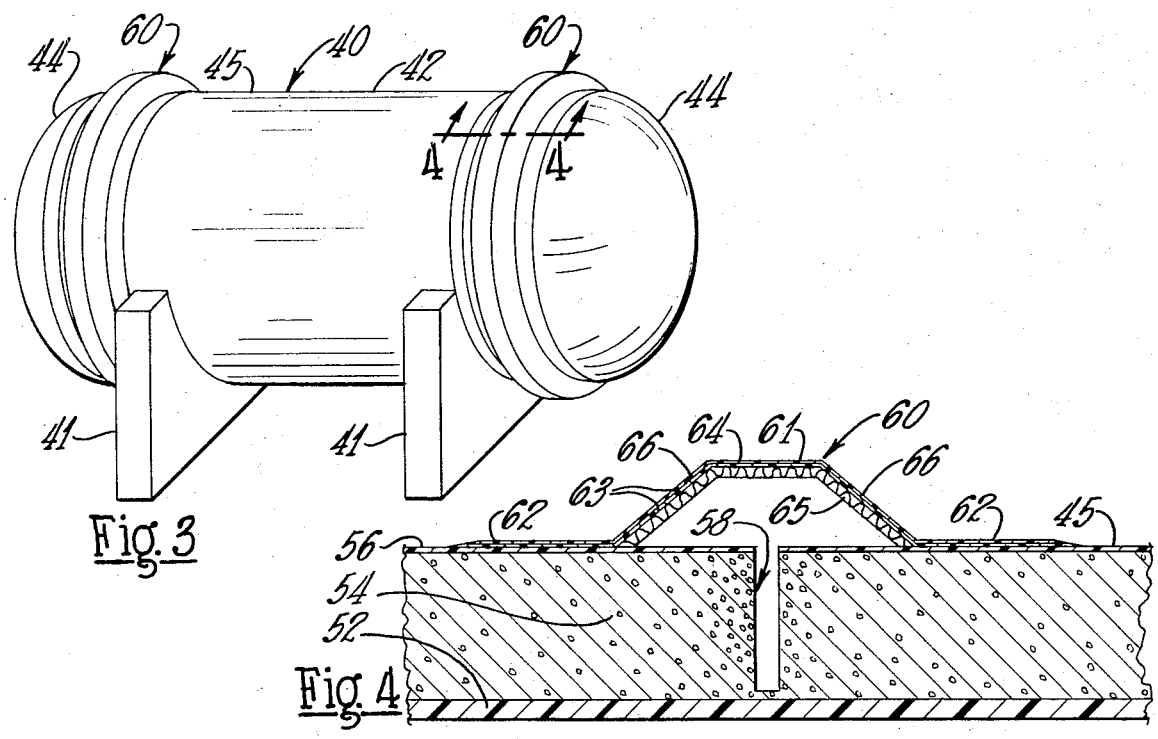
Fig.3
Fig.4

SLITTED INSULATING RIGID WALL COMPOSITE

The invention relates generally to an expansion joint for composite wall constructions, especially those for large diameter plastic tanks. The invention is particularly well suited for sandwich type wall constructions for large volume insulated tanks.

Insulated plastic tanks for storing chemicals and other fluids at temperatures independent of the ambient environment, both above and below ground, are well known. One well known type of insulated tank has a sandwich wall construction. The tank includes an inner fluid containing shell usually consisting of a reinforced plastic material. Superimposed on the inner shell is a layer of cellular insulating material such as urethane foam. Disposed over the insulating layer is a protective shell, again usually of reinforced plastic. In the normal method of forming such a sandwich wall, the foam core will be integrally bonded to both the inner and outer plastic shells.

Because insulated tanks are intended to store fluids at temperatures different than the temperature of the environment in which the tank is used, a temperature differential across the sandwich wall necessarily exists. When the tanks are formed both the inner and outer shell finish curing at generally the same ambient temperature. Consequently when the tank is put into use, and the temperature differential established between the inner and outer shells, expansion and contraction of the shells relative to each other may take place. Since the two shells are joined by the insulating core the expansion or contraction of one shell will impart a stress to the other shell. This problem is further compounded by the fact that the inner and outer shells are frequently of different material constructions and therefore have different coefficients of expansion.

It has been found in practice that the expansion and contraction of one of the shells relative to the other can cause a failure in the tank. For example it has been observed that where the contained fluids are at a substantially higher temperature than the exterior environment, expansion of the inner shell, or contraction of the outer shell, has resulted in a buckling of the inner shell. It has been observed in other occurences that the radial expansion of the hotter inner shell causes cracking of the cooler outer shell.

Because of the above described problem it has become necessary to incorporate an expansion joint in such sandwich wall constructions. Heretofore such expansion joints have consisted of a slit in the outer shell and a protective skirt extending across the slit from one side. The overhanging skirt is provided to keep rain and other contaminants from entering directly into the slit. Where the outer shell of the tank is reinforced plastic, the skirt is usually of the same or similar material and is adhered to the outer shell only along one side of the slit.

Such prior art joints are suitable for use around the circumference of the tank since the skirt can prevent moisture entering directly into the joint. However such joints cannot be used along a vertical orientation, or where high humidity is present and threatens to enter the slit and deteriorate the foam core. Furthermore, such joints tend to weaken the other shell structure. Since the shell is cut into two pieces, some loads exerted on the outer shell will be imparted to the foam core.

It is therefore an object of this invention to provide a wall construction for fluid handling devices, especially fluid storage tanks, adapted for expansion and contraction, and having a moistureproof expansion joint that does not materially weaken the wall construction.

It is a further object of this invention to provide a sandwich wall construction for insulated storage tanks adapted for relative expansion between the inner and outer layers of the sandwich construction.

It is a still further object of this invention to provide a wall construction having an expansion joint which is adapted to provide additional stiffness in the wall.

These and other objectives are achieved in the present invention by a sandwich wall construction having a slit in one of the reinforced plastic layers of the wall and a shaped expansion member overlaying the slit in bridging relationship. The member has a pair of base sections adhered respectively to the layer on opposite sides of the slit and a central portion spaced from the wall and extending between the base sections. Although the expansion member is preferably of a substantially rigid material, such as a hardened resin reinforced with glass fibers, the member is shaped such that the base sections can move toward and away from each other in accord with the expansion or contraction of the wall. In the particular embodiment shown the expansion member is trapezoidal in cross-section.

The expansion member overlays the slit in the one layer of the tank wall and is bonded to the layer on both sides of the slit. Since the expansion member is of substantially rigid material it is capable of carrying or transferring some of the load on the wall. Therefore the expansion joint of the present invention does not weaken the tank wall to the extent of the prior art expansion joints. Furthermore, since the expansion member is continuous and is integrally bonded to the wall on both sides of the slit, the joint of the present invention is moistureproof and is suited for use vertically as well as horizontally. This feature is especially significant on insulated tanks where moisture may cause deterioration of the foam insulating layer.

An additional feature of the invention results from the combination of the rigid material and the shape of the expansion member. This combination makes the expansion member comparable to a stiffening rib thus helping to stiffen the tank wall in the direction parallel to the joint. As will be discussed the joint can be disposed longitudinally to provide additional beam strength for the wall, or disposed circumferentially whereupon it provides additional hoop strength.

A further detailed description of the invention now follows with reference to the accompanying drawings, of which:

FIG. 1 is a view in perspective of a vertical insulated storage tank for fluids having a wall construction in accordance with one embodiment of the present invention;

FIG. 2 is a view in cross section through the wall of the tank shown in FIG. 1 as taken along the line 2—2 in FIG. 1;

FIG. 3 is a view in perspective of a horizontal insulated storage tank for fluids having a wall construction in accordance with another embodiment of the invention; and FIG. 4 is a view in cross-section through the wall of the tank shown in FIG. 3 as taken along the line 4—4 in FIG. 4.

The insulated storage tank 10 shown in FIG. 1 is typical of those having the sandwich type wall construction discussed previously. In general the tank comprises a cylindrical shell 12, a generally flat base 11, and a dished end cap 13. Referring to the sectional view of the tank wall 15, as shown in FIG. 2, the inner fluid containing shell 20 is usually of glass fiber reinforced plastic. In many cases the reinforcement is provided by continuous windings of glass rovings providing sufficient tensile strength to withstand the pressures of the contained liquids. In other cases the reinforcement may be randomly distributed chopped glass strands, glass mats or cloths, or a combination of chopped strands, glass mats or cloths, and filament windings.

The inner shell is typically between 0.150 inch to 0.500 inch thick depending on the application. The insulating core 22 is preferably a urethane foam. The thickness of the insulating layer will vary according to the application and typically is between 1 to 4 inches. The foam core is applied on a mandrel and will bond to the inner shell.

The outer shell 24 again preferably consists of a plastic resin reinforced with either continuous or discontinuous glass fibers. The outer shell is primarily intended as a protective covering for the insulating layer 22, and is generally about one-tenth inch thick. Through the integral bonding of the insulating layer to both the inner and outer layers 20 and 24, a sandwich structure is created providing a stronger tank.

In the normal process for making the tank 10, the inner layer 20 is first formed on a rotating mandrel. While the resin of the inner layer 20 is still uncured and tacky the insulating layer 22 is foamed in place. Finally, before the foam has fully set the outer layer 24 is formed. After the resins of layers 20 and 24 and the foam of layer 22 are fully cured an integral bond between the three layers is effected.

As mentioned previously, a temperature differential is established across the sandwich wall when in use since the fluid contained therein is usually at a temperature different than that of the environment. Since the inner shell 20 and outer shell 24 are frequently of different composite materials, they will have different coefficients of expansion. Consequently the expansion or contraction of one shell will likely result in tensile or compressive stresses imparted to the other shell. In some cases these stresses are so severe as to cause a failure in the tank structure either in the form of a buckling of the inner shell, or a fracturing of the outer shell.

In order to provide for the relative expansion or contraction between the inner and outer layers of the wall 15 it has become necessary to incorporate an expansion joint such as that indicated generally at 30 in FIGS. 1 and 2. Referring to FIG. 2, the joint comprises a slit 28 provided in at least one of the tank shells; in this case the outer shell 24. The slit may or may not extend through the foam layer 22. The width of the slit will vary in the particular application, but a width of one-eight to one-fourth inch has been found suitable in most cases. Furthermore as used herein, the word slit is meant to cover any type of separation which will allow the outer shell 24 to expand or contract in accordance with the expansion or contraction of the inner shell, including cuts, fissures, grooves, splits, etc.

Unless otherwise provided for, the slit 28 will expose the foam insulating core to the effects of the environment. Since most urethane foams are susceptible to deterioration due to moisture, it is necessary to prevent moisture from entering into the slit. In addition the slit 28 weakens the outer shell causing an increase in the loading on the foam layer.

To compensate for these prejudicial effects of the slit, the shaped expansion member 31, shown in FIG. 2, is incorporated in the wall structure. The member 31 overlaps the slit and extends the length thereof, as shown in FIG. 1. The expansion member is made by applying a cardboard form 35 in bridging relation over the slit 28 and taping it to the outer layer 24. One or more layers of reinforcement mat 33 saturated with hardenable resin are then laid up over the cardboard form. Although many types of reinforcements could be used mat composed of glass fibers, including bonded mat, chopped strand mat, continuous strand mat, scrim, and woven rovings are preferred. The resin impregnated mats extend onto the tank wall on both sides of the cardboard form, and the resin of the member 31 is integrally cured with the resin of the outer layer 24.

Although the expansion member is made of a substantially rigid material i.e., reinforced plastic, it is shaped such that it can flex in accordance with the expansion or contraction of the outer layer 24. To this end the member comprises a pair of spaced base sections 32 adhered respectively to the outer layer 24 on opposite sides of the slit 28, and a central portion abridging the slit and extending between the base sections. In the particular embodiment shown, the central portion is trapezoidally shaped and consists of a plateau region 34 spaced from the outer layers 24 above the slit, and two oppositely inclined leg portions 36 connecting the plateau to the base sections.

Due to the shape of the member 31, when expansion or contraction of the outer layer 24 takes place, the base sections 36 can move toward or away from each other in response to the movement of the layer 24. Although the trapezoidal shape shown is particularly suitable for this purpose, it will be readily understood that other configurations including semi-cylindrical, square, rectangular, triangular, etc., could be used to perform in a similar manner.

Referring now to FIG. 3 a horizontal insulated tank 40 is shown resting on saddles 41. The tank 40 consists of a cylindrical body 42 and two hemispherical end caps 44. In the tank of FIG. 3 two expansion joints 50 are shown disposed circumferentially around the tank. A cross section of the joint 50 is shown in FIG. 4 and is similar to the joint of FIG. 2, except that in FIG. 2 the wall 15 is curved in cross section while in FIG. 4, the wall 45 is straight in cross-section.

In FIG. 3, the sandwich wall of the tank again comprises an inner shell 52 of reinforced plastic; an insulating core 54 of urethane foam; and an outer shell 56 of reinforced plastic. A slit 58 is provided in the outer shell 56 and is shown extending substantially into the foam layer. An expansion member 61 is disposed in bridging relationship over the slit, and is bonded fluid-tight to the outer shell 56 on both sides of the slit. The member is trapezoidally shaped and comprises a plateau portion 64, two oppositely inclined sidewalls 66 and two base sections 62. The member is made by laying up one or more layers of a glass mat 63 saturated with resin over the cardboard form 65 and curing the resin to effect the bond to the wall 56.

The two alternative tank embodiments shown in FIGS. 1 and 3 are presented to emphasize another feature of the invention. Since the expansion members 31 and 61 are made of a substantially rigid reinforced plastic material they become in effect stiffeners in the direction parallel to the joints. Thus in FIG. 1, the expansion member 31 provide additional beam strength for the tank shell, which is of benefit during handling and in certain installations. Alternately, in FIG. 3, the expansion members 61 provide additional hoop strength for the tank 40. Although the longitudinal joint is shown on a vertical tank in FIG. 1, and the circumferential joint is shown on a horizontal tank in FIG. 3, it should be readily apparent that either type of joint can be used on either type of tank, or the joints could be combined on a given tank. Furthermore, although not shown, it is also understood that in some applications it may be desirable to apply or extend one or more expansion joints of the type described across the end cap of the tanks as well.

Finally although the expansion member of the embodiment described in detail comprises one or more layers of glass fiber reinforced plastic, the expansion member could as well consist of other substantially rigid materials including but not limited to, unreinforced plastic, sheet metal, and other sheet materials capable of some flexure when properly shaped.

Having thus briefly described the invention, it is understood that other modifications and adaptations can be made by those skilled in the art, and such modifications and adaptations are within the scope of the invention as described above and as further defined in the claims which follow.

We claim:

1. A rigid composite wall for fluid handling devices which is adapted for expansion and contraction, comprising:

two layers of fiber reinforced plastic adhered together by an intermediate layer of rigid cellular insulation such that expansion or contraction of one plastic layer will impart a stress to the other plastic layer through the cellular layer, one of the plastic layers having a slit through it effective to allow it to expand or contract in response to expansion or contraction of the other plastic layer; and a reinforced plastic member overlaying the slit comprising: two base sections spaced on opposite sides of the slit and joined to the slit layer of plastic; and a bridging portion spaced from the slit layer and connecting said base sections such that the base sections can move toward and away from each other in response to expansion or contraction of the slit layer.

2. A composite wall as recited in claim 1, wherein the member and the slit extend a length substantially greater than the width of the member, and wherein the member is sufficiently rigid and of a shape effective to provide stiffness for the wall in the direction parallel to the slit.

3. A wall construction as recited in claim 1, wherein the slit extends through one of the reinforced plastic layers and into the layer of foam.

4. A composite wall as recited in claim 1 wherein the base sections of the plastic member are integrally bonded to the slit layer such that the member provides a fluidtight cover over the slit.

5. A laminated wall as recited in claim 1, wherein the member has a trapezoidal cross section having a plateau spaced from said slit layer, and oppositely inclined sidewalls integral with said plateau and joined to said slit layer on opposite sides of the slit.

6. A laminated wall as recited in claim 1 wherein the cellular insulating layer is rigid polyurethane foam.

* * * * *